(12) United States Patent
Laduke

(10) Patent No.: US 10,165,239 B2
(45) Date of Patent: Dec. 25, 2018

(54) DIGITAL THEATRICAL LIGHTING FIXTURE

(71) Applicant: DISNEY ENTERPRISES, INC., Burbank, CA (US)

(72) Inventor: Thomas F. Laduke, Orange, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 116 days.

(21) Appl. No.: 15/383,078

(22) Filed: Dec. 19, 2016

(65) Prior Publication Data

US 2018/0176521 A1    Jun. 21, 2018

(51) Int. Cl.
  *F21S 2/00*      (2016.01)
  *H04N 9/31*     (2006.01)
  *H05B 33/08*    (2006.01)
  *F21W 131/406*  (2006.01)

(52) U.S. Cl.
  CPC .............. *H04N 9/3194* (2013.01); *F21S 2/00* (2013.01); *H04N 9/3141* (2013.01); *H05B 33/0854* (2013.01); *F21W 2131/406* (2013.01)

(58) Field of Classification Search
  CPC .................................................. H04N 5/2256
  See application file for complete search history.

(56) References Cited

U.S. PATENT DOCUMENTS

| 5,828,485 | A | 10/1998 | Hewlett |
| 7,576,727 | B2 | 8/2009 | Bell |
| 7,635,188 | B2 | 12/2009 | Belliveau et al. |
| 8,047,678 | B2* | 11/2011 | Belliveau ............. H05B 37/029 362/249.01 |
| 8,232,745 | B2 | 7/2012 | Chemel et al. |
| 9,801,260 | B2* | 10/2017 | Anthony ............ H05B 37/0245 |
| 2002/0181231 | A1* | 12/2002 | Luk ......................... F21V 5/008 362/240 |

(Continued)

OTHER PUBLICATIONS

Pang, Wai-Man, "Estimating Light Vectors in Real Time," May/Jun. 2004.

(Continued)

*Primary Examiner* — Paulos M Natnael
(74) *Attorney, Agent, or Firm* — Marsh Fischmann & Breyfogle LLP; Kent A. Lembke

(57) ABSTRACT

A digital theatrical lighting fixture that can be used to provide a new lighting system with improved features and functionality. The digital theatrical lighting fixture integrates light production, light modulation, and a camera into a single device along with a control interface, integrated image processing capability such as for processing images captured by the camera, and communication capability, e.g., for communicating with a central controller and/or with other digital theatrical lighting fixtures. This highly integrated fixture uses the camera to monitor a lit scene, and its (or the central controller's) intelligence/software to dynamically adjust its output as well as to implement a show lighting script much like a projector. In a lighting system, the lighting fixtures described herein can communicate to each other and to a central controller (or control systems) such that lighting produced by the lighting system can be calibrated and coordinated in a comprehensive way.

13 Claims, 4 Drawing Sheets

(56) References Cited

U.S. PATENT DOCUMENTS

| | | | | |
|---|---|---|---|---|
| 2007/0268539 | A1* | 11/2007 | Toishi | G03H 1/28 |
| | | | | 359/11 |
| 2009/0028032 | A1* | 1/2009 | Toishi | G11B 7/0065 |
| | | | | 369/103 |
| 2009/0207604 | A1* | 8/2009 | Robotham | F21S 10/02 |
| | | | | 362/230 |
| 2010/0201702 | A1 | 8/2010 | Frank et al. | |
| 2011/0285854 | A1* | 11/2011 | LaDuke | G01S 11/00 |
| | | | | 348/169 |
| 2012/0219699 | A1* | 8/2012 | Pettersson | B05B 12/122 |
| | | | | 427/8 |
| 2014/0252958 | A1 | 9/2014 | Subotnick et al. | |
| 2015/0035437 | A1* | 2/2015 | Panopoulos | F21V 14/02 |
| | | | | 315/112 |
| 2016/0081164 | A1 | 3/2016 | De Bruijn et al. | |

OTHER PUBLICATIONS

Park, Heemin, "Intelligent Lighting Control Using Wireless Sensor Networks for Media Production," KSII Transactins on Internet and Information Systems, vol. 3, No. 5, Oct. 2009.
https://www.highend.com/products/digital-lighting/dlhd.
hittp://www.robe.cz/de/products/discontinued/article/digitalspot-y000-dt/.

* cited by examiner

DIGITAL THEATRICAL LIGHTING FIXTURE

BACKGROUND

1. Field of the Description

The present description relates, in general, to stage or theatrical lighting systems, components, and methods and, more particularly, to theatrical lighting fixtures and theatrical lighting systems and methods implementing the new theatrical lighting fixtures.

2. Relevant Background

Stage or theatrical lighting is the craft of lighting as it applies to the production of theater, dance, opera, and other performance arts. Theatrical lighting has multiple functions including selective visibility, revelation of form, focus, mood, location and time of day, projected scenery, plot/script changes, composition, and effect, and there are many applications for lighting equipment and theatrical lighting including lighting for shows and rides in many amusement or theme parks.

For many shows, hundreds to thousands of lighting instruments or fixtures will be mounted in a fixed position so as to be directed toward a particular portion of a theatrical stage or other show or entertainment space. Each lighting fixture typically includes a box or housing (e.g., a metal or plastic container to house the whole instrument and prevent light from spilling in unwanted directions), a light source (or lamp), and a lens or opening where the light is output from the housing. Traditional theatrical lighting fixtures use a high output, broad spectrum white light source that may be modified by filters and perhaps shaped (e.g., by a gobo, which is a physical stencil or template that is placed inside or in front of the light source to control the shape of emitted light). Most theatrical light sources are tungsten-halogen lamps, but, as the power density and efficiency of light emitting diodes (LEDs) and other solid state light sources (such as lasers) improves, they are increasingly used for the light source of theatrical lighting fixtures to reduce maintenance and provide higher quality and intensity light and a variety of color. Also, most theatrical lighting fixtures are limited to providing lighting as they do not have image-forming capability.

More recently, many theatrical lighting systems have used projectors as substitutes for some or all of the more conventional lighting fixtures. Projectors, in contrast to conventional lighting fixtures, include some kind of spatial light modulation and/or controlled modulation of the light source itself such that moving images and color changes can be digitally controlled. For example, a digital light processing (DLP) projector may be used as a theatrical lighting fixture so provide a high output, such as 2000 to 30000 Lumens using RGB LEDs and/or lasers as the light source, to project onto three dimensional (3D) scenery. A projector can be used to provide a background or scenographic layer with sub-pixel accuracy such as by projecting a 3D image onto a 3D print to get a much brighter and darker effect. The projector may also be used to provide a lighting layer by using the projector as a conventional lighting fixture (e.g., to provide time of day, simulate the sun or the moon, or the like) or such lighting may be provided with a conventional lighting fixture. The use of a projector in a theatrical lighting system can also be used to provide a visual effects layer such as to project smoke or other effects in a theatrical or show space.

SUMMARY

Briefly, the inventor recognized that there are a number of problems with conventional theatrical lighting systems, and, as a result, a demand in the entertainment industry for improved theatrical lighting fixtures. Traditional light sources and projectors used as theatrical lighting have been operated as individual units. The coordination and calibration of their interaction in a lighting system for a stage or other setting has been performed manually. This manual operation has, in some cases, been performed with assistance of external hardware tools such as photometers or separate cameras that monitor a scene and allow adjustment of the light fixtures to achieve a particular effect.

The inventor understood that housing the theatrical lighting in separate devices from the calibration and control devices and software increases the expense and manual effort involved in stage or theatrical lighting. It also limits the functionality that could be achieved if these devices were more closely coupled.

With these issues in mind, the inventor created a digital theatrical lighting fixture (or "environment engine") that can be used to provide a new lighting system with improved features and functionality. The digital theatrical lighting fixture integrates light production, light modulation, and a camera into a single device (e.g., included in a single box or housing) along with a control interface and some integrated image processing capability (e.g., for processing images captured by the camera(s)) and communication capability (e.g., for communicating with a central controller and/or with other digital theatrical lighting fixtures or environment engines). This highly integrated fixture uses the camera(s) to monitor a lit scene, and its (or the central controller's) intelligence/software to dynamically adjust its output as well as to implement a show lighting script much like a projector.

In a lighting system, the lighting fixtures described herein can communicate to each other and to a central controller (or control systems) such that lighting produced by the lighting system can be calibrated and coordinated in a comprehensive way. For example, in some embodiments, one lighting fixture may operate with its camera(s) and processor/software to detect that a prop in a show space (e.g., a stage, a space along a ride, and so on) is presently darker than planned (e.g., defined in a show lighting file defining lighting throughout a space for a show over the show's timeline). In response, the lighting fixture can communicate a message to another fixture responsible (or partially responsible) for lighting this prop to inform the second fixture of this lower lighting condition, and the second fixture can process the received message and, in response, adjust (e.g., increase) its light output to compensate and better match the planned lighting for the prop during a particular time period or portion of a show/display.

In the same or other lighting systems, camera inputs from multiple fixtures can be communicated to the central controller for analysis including creating a 3D model of the scene, which may be thought of as a structured light 3D model of the scene. This 3D model may be generated using the disparity of the cameras to synthesize a template for an artist/designer to use for each projector's POV, and templates can be stitched together so that multiple projector POVs can represent a single canvas for the artist. In some cases, the central controller may then generate and communicate control signals to each of the system's lighting fixtures to cause them to each operate to adjust their output to suit a single lighting scheme (defined in a show lighting file), which may be predefined for the show space/stage by the artist/designer or may be dynamically computed, in some cases, by the central controller. In some or all of the embodiments, the camera monitors the scene lighting, including portions of the scene lit by at least one other device.

More particularly, a theatrical lighting fixture is described for use in a lighting system to provide lighting to a space such as a theatrical stage or set. The lighting fixture includes a housing (or box) and a light source in the housing operable to generate light. For example, the light source may be a light emitting diode (LED) source or a laser-based light source. The lighting fixture further includes a light modulator (or image forming device), in the housing, operable to modulate the light generated by the light source to form one or more images (e.g., a digital light processing (DLP) modulator assembly). The lighting fixture also includes a communications module (e.g., for wired and/or wireless communications) and a camera, supported by the housing, operable to capture digital images. Further, the fixture includes a fixture controller (hardware and software) operable to generate control signals to selectively operate the light source, the light modulator, and the camera and to transmit and receive communications with the communications module.

In some implementations, the camera is positioned in the housing such that its lens is substantially coaxial with an output axis (e.g., an output or main lens) of the light modulator, e.g., by positioning the camera adjacent the light modulator in the housing to be directed toward or facing the same direction as the light modulator. In the same or other embodiments, the transmitted communications (or messages sent using known protocols for transferring digital data between communicatively linked devices) include the captured images from the camera, and the communications are transmitted to a central lighting system controller and/or to another theatrical lighting fixture in a lighting system (e.g., for processing by the other fixture to affect its operations/light output onto the stage/space to achieve improved lighting).

In some cases, the lighting fixture includes memory or data storage devices in the housing that are used for storing a lighting script. The lighting script may include projector content (e.g., a video), and the controller controls the light source to generate the light based on the lighting script including setting illumination levels and controls the light modulator to form the one or more images using the projector content (e.g., the controller acts as a media server onboard the lighting fixture).

In particular implementations, the fixture controller modifies operation of the light source or the light modulator with the control signals in response to image processing of the images captured by the camera. The image processing includes comparing the images with planned illumination of surfaces of a 3D model of a space. Further, the comparing process or step (or functionality) includes determining illumination of one of the surfaces differs from the planned illumination for the one of the surfaces and wherein the modifying of the operation of the light source or the light modulator includes modifying the light generated by the light source.

DETAILED DESCRIPTION OF THE PREFERRED EMBODIMENTS

Figure 1:
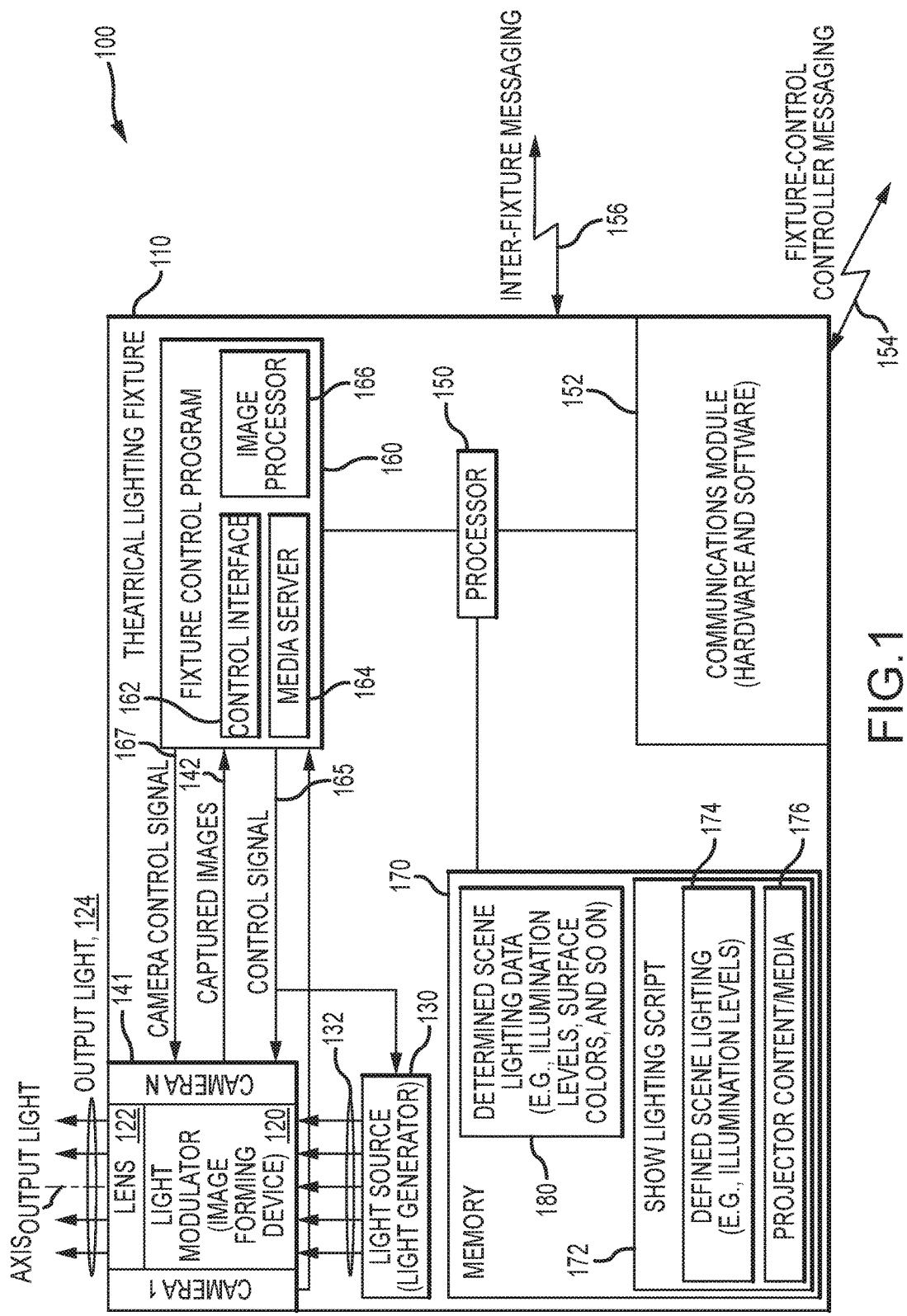
FIG. 1 is a functional block diagram of a theatrical lighting fixture of the present description.

Briefly, a theatrical lighting system and control method is described that makes beneficial use of a plurality of digital theatrical lighting fixtures. Each lighting fixture includes a light generator (or light source), one or more cameras, a light modulator (or image forming device as found in a projector such as a DLP projector), an inter-device communication module/assembly, and a fixture controller (hardware, software, and memory). The lighting fixtures may replace conventional stage lights and may be used for projection mapped costuming among many other uses in theatrical applications, in amusement/theme parks, and other settings.

Integration of these core functions/components into the lighting fixture (or a single device) makes deployment (or set up) of the lighting system for a particular show space or stage easier as there will be no need for laser/LiDAR to obtain a 3D model of the space as this data is obtained from the onboard cameras. The new lighting fixtures in the lighting system also enable new functionalities including 3D scene modeling on an ongoing basis and dynamic lighting implementation and control in a way that was not practical with a set of standalone lighting devices. The new theatrical lighting fixture may be designed so as to take advantage of solid state illumination technologies for its light source such as an LED, a laser, or a laser phosphor light source. Packaging of the lighting fixture provided by its box/housing may be smaller than existing light housings while the output light intensity may be significantly brighter than current products. These advantages and functionalities will make the theatrical lighting fixtures useful for any large venue lighting and, depending on costs, may also be practical for smaller scale commercial and even consumer lighting.

Each theatrical lighting fixture may be thought of as an "environment engine," and a theatrical lighting system may often include many environment engines communicatively linked together and to a central controller. The central controller can act to synchronize operations of all the environment engines in a lighting system. The environment engines replace the use of conventional theatrical light fixtures that were each manually controlled. In creating the new environment engine, the inventor merged the lighting and projector worlds.

In the following discussion, real-time (or nearly real-time) adjustments may be made on content (e.g., generating media in real time like a real-time image generator used in gaming and flight simulation and so on). However, in many embodiments, content is only or also created in off-line processing. Then, the scene is updated with this off-line created content so as to create looks that can be switched between by the controller. This is useful in environments where attractions or shows are fixed or known so that real-time image generation may not be needed. Real-time content generation may be desirable, though, for other applications such as in augmented and virtual reality (AR and VR) settings.

FIG. 1 illustrates an exemplary theatrical lighting fixture 100 of the present description with a functional block diagram. The fixture 100 typically will include a housing or box 110 that encloses and supports the combination of components shown into a single unit, and the housing 110 may be formed of metal, plastic, and/or other materials and may take a form factor similar to existing projectors (e.g., be smaller than many existing stage lighting fixtures). In use, the housing 110 is typically mounted similar to conventional stage lighting fixtures at a particular location and direction (e.g., with its output lens 122 directed in a particular direction to a particular portion of a stage). The specific location of the output lens 122 may be determined (such as with a global positioning system (GPS) device or in some other well-known manner of determining a 3D position), and this provides known nodal points of each output lens for generating a lighting scheme for a lighting system including the fixture 100 and also provides nodal points for the cameras 140, 141 to facilitate creation of 3D models of the stage or space in which the fixture 100 is positioned.

The lighting fixture 100 includes a light modulator (or image generator) 120 that modulates light 132 from a light source (or light generator) 130. The light modulator 120 outputs the modulated light 124 via an opening or lens 122 mounted on the housing 110 (e.g., directs image-producing light 124 toward a stage along the lens axis, $\text{Axis}_{Output\ Light}$. The output light 124 has an illumination level, a color, and, in some cases, an image (still, video, 3D, or the like) based on control signals 165. The light source 130 may take the form of a conventional stage lighting lamp, may take the form of a xenon arc lamp, may take the form of an LED source (using LED technology to provide colored light 132 or the like), or may take the form of a laser source (e.g., with one, two, or three color lasers). Likewise, the light modulator 120 may take numerous forms to practice the fixture 100 such as a modulator implementing DLP projector technology, implementing LCOS imaging technology, and the like. The modulated light 124, hence, may be white or colored light and/or may be modulated to generate a still or video (2D or 3D) image on a projection surface (e.g., a 2D or 3D surface on a theatrical stage). Note, content may be created "live" or in near real-time and/or it may be created off-line for later playback or use in operating the lighting fixture 100.

One, two, three, or more cameras 141 are provided in the lighting fixture 100 and are mounted to be co-axial or nearly so (proximate to the projection lens and the known disparity is used to synthesize the 3D model of the space) with the light modulator's lens 122 (or $\text{Axis}_{Output\ Light}$). The cameras 141 respond to control signals 167 to capture images (or scene image-based data) 142 that are communicated to a fixture control program 160 for processing (e.g., performing a structured light process). By providing one to three (or more) cameras 141 in the lighting fixture 100, a separate process of modeling a scene is not required (e.g., a rigging of laser/LiDAR devices as in conventional practice) to create a 3D model of a lighted space/stage. The cameras 141 are typically digital cameras able to capture still or video images 142, and the inclusion of cameras 141 allows scene lighting to be determined during the operation of the fixture 100 within a lighting system to allow real-time or dynamic control 165 over the modulator 120 and/or light source 130 to better follow a show lighting script 172 (e.g., to increase or decrease illumination levels, to vary output colors or color levels, and the like).

The lighting fixture 100 also includes a processor(s) 150 that manages operations of a communications module 152 to communicate with other fixtures in a lighting system as shown at 156 and with a central controller as shown at 154. The communications module 152 includes software and hardware to support generation and transmittal of (and receiving) these messages 154, 156, e.g., include a transceiver for wired or, more commonly, wireless digital communications with networked devices in a lighting system.

The lighting fixture 100 also includes memory or data storage devices 170 that are managed/accessed by the processor 150 such as to store a show lighting script 172 and determined scene lighting data 180. The show lighting script 172 may be provided by the central controller in messaging 154, and the script 172 is shown to include scene lighting 174 and also projector content/media 176 (e.g., video content to be projected 124 by the light modulator 120 during operation of the light source 130 to provide light 132). The script 172 defines when and how the light modulator 120 and light source 130 are to be operated during a particular show (e.g., illumination 124 to be provided along a show's timeline). The determined scene lighting data 180 typically includes illumination levels, surface colors, and the like obtained from the scene in images 142 from cameras 141 through processing by the fixture 110 (or by the central controller processing data in messages 154).

The processor 150 executes code or runs a software program(s) to provide the functionality of a fixture control program 160. The fixture control program 160 includes a control interface 162 for generating messages 154 for transmittal to the central controller and for processing messages 154 from the central controller. In response, the control program 160 may act to operate the light modulator 120 and light source 130 with control signals 165 to operate in a particular manner to suit present operations of a lighting system such as to operate according to the show lighting script 172. The fixture control program 160 also includes a media server 164 that acts to retrieve projector content 176 for projecting via signals 165 with the modulator 120 as shown with output light 124. In this way, the fixture 100 includes an onboard or resident video server.

The messages 154 may be configured based on a protocol or follow a messaging protocol such that the messages 154 may include messages to: (1) allow a device to describe its own capabilities and control interfaces; (2) allow a device to describe its current output or control settings; and (3) implement an ability to negotiate for control over all or part of a scene so that peers can logically arrange themselves as master/slave/peer when there is not a central controller and to have master/slave/peer defined for portions of the 3D scene rather than all or nothing. The logical architecture of control by or with control program 160 and processor 150 by one or more cameras is, in some embodiments, dynamically adjusted as light devices or lighting fixtures are added/removed from the scene, e.g., for a parade or similar application with a mix of fixed and moving light fixtures.

Further, the fixture control program 160 includes an image processor 166 that is designed to process the captured images 142 to generate a set of determined scene lighting data 180, which may be stored in memory 170 at least temporarily. The data 180 may be wholly or partially communicated to a central processor such as via messages 154 such as for creation of a 3D model of a scene or for real time monitoring of operations of a lighting system from the points of view (POVs) of the fixtures 100 (or cameras 141/lens 122). The determined scene lighting data 180 may include illumination levels on various surfaces of a set/scene being illuminated with the fixture 100, and the image processor 166 may act to compare these with illuminations levels defined by the scene lighting 174 of the show lighting script 172. In response, the image processor 166 (or another component of the program 160) may act to modify operation of the light source 130 to change (increase when comparison indicated measure illumination levels are below those in the defined scene lighting 174 for a particular surface or decrease when the comparison indicates a surface is being over illuminated) the illumination of a particular scene surface. In other cases, the image processor 166 may cause the fixture control program 160 to generate a message 156 for another one of the lighting fixtures in the system, and this other lighting fixture may operate to modify its operations based on the captured images of the scene, e.g., to increase or decrease its output illumination levels to increase or decrease illumination of a particular surface(s) in the scene or stage.

Figure 2:
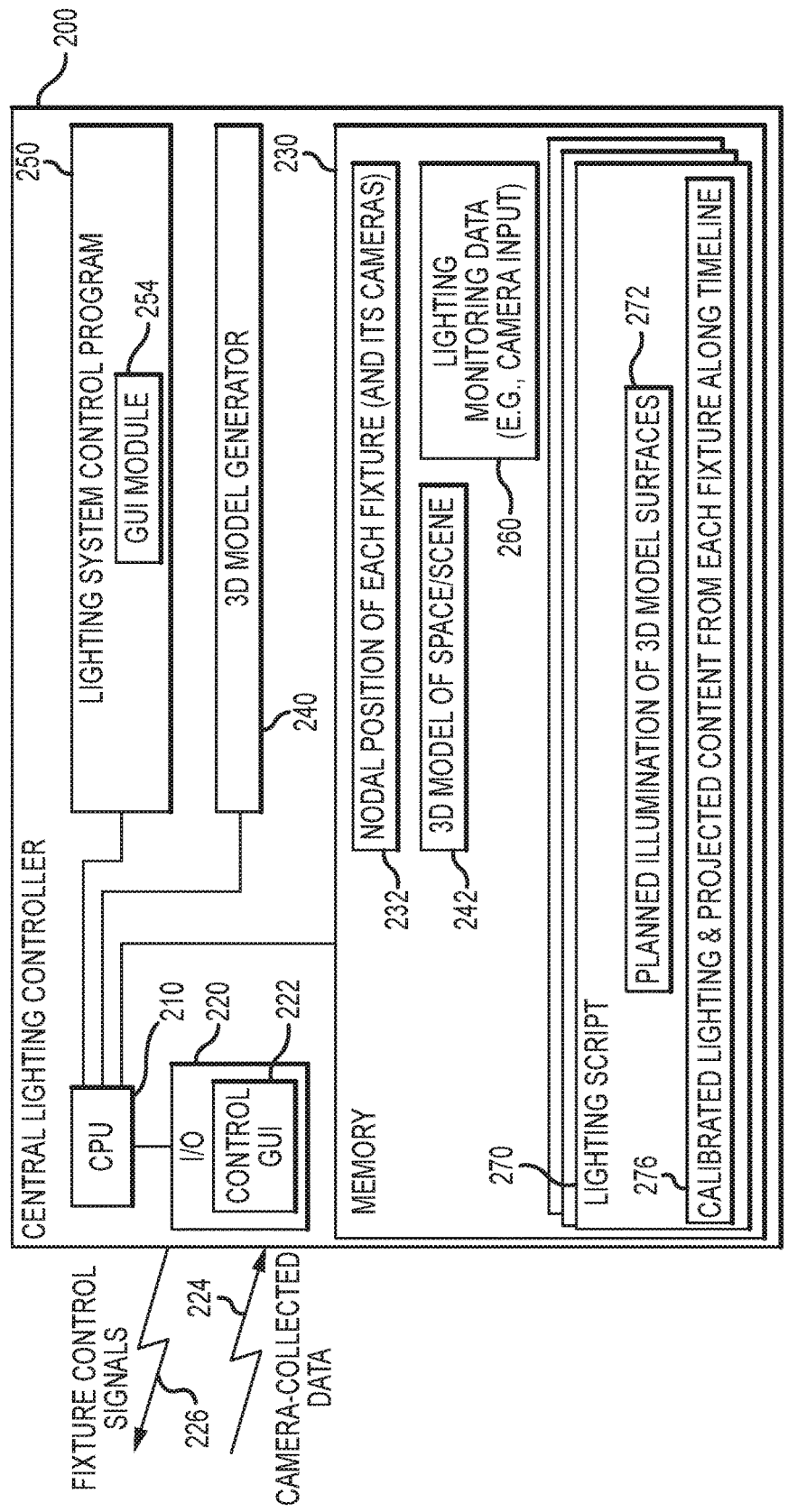
FIG. 2 is a functional block diagram of a central lighting controller for use in providing synchronized control of a plurality of theatrical lighting fixtures in a lighting system of the present description.

FIG. 2 is a functional block diagram of a central lighting controller 200 for use in providing synchronized control of a plurality of theatrical lighting fixtures (which may each take the form of lighting fixture 100 of FIG. 1) in a lighting system of the present description. The controller 200 is a special-purpose computing device or computer adapted to process camera-collected data 224 from lighting fixtures of a lighting system and to generate a set of fixture control signals 226 to provide coordinated operations of the lighting fixtures of the lighting system to provide desired lighting of a scene (e.g., a theatrical stage/set or other space).

To this end, the controller 200 includes a processor(s) 210 to manage operations of a set of input/output devices 220 such as a monitor that may be used to display a control graphical user interface (GUI) 222 on a conventional screen or touchscreen and other devices to provide a user data and receive a user's input (e.g., selection of a lighting script for automated control of lighting fixtures, manual control over operation of one or more lighting fixtures, and the like) such as a keyboard, a mouse, a touchscreen/pad, a voice recognition assembly, and so on. The I/O devices 220 may also include a transceiver or the like for supporting wireless or wired communications with theatrical lighting fixtures of a lighting system (and a network in some cases to retrieve projector content and/or lighting scripts).

The processor 210 executes code or runs a software program to provide the functionality of a lighting system control program 250, which includes a GUI module 254 for generating and providing the GUI 222 to an operator of the controller 200. Further, the processor 210 executes code or runs a software program to provide a 3D model generator 240. The controller 200 also includes data storage or memory 230 (or can access such memory on a remote device such as over a network), which is managed by the processor 210.

As shown, the memory 230 stores a nodal position of each fixture at 232 (which provides the X-Y-Z location of each camera in the lighting system, too), and this data is used by the 3D model generator 240 in generating a 3D model 242 of the space/scene (e.g., a theatrical stage or set). As input for the model 242, the 3D model generator 240 also obtains camera-collected data 224 during an initial stage of operations of the controller 200. Specifically, the generator 240 (or control program 250) may transmit control signals 226 initiating operation of the cameras of the fixtures to gather images of the space/stage and provide camera-collected data 224. With this data and the position data as input, the 3D model generator generates a 3D model of the space/scene 242, which includes a 3D definition of each object/surface in the space/stage.

With this 3D model 242 completed, the lighting system control program 250 (or another software-based tool) is used by an operator of the controller 200 to generate one or more lighting scripts 270. For example, each script 270 may be generated to operate the lighting system to provide desired lighting for a particular theatrical show, a display along an amusement park ride, and the like. Each of the scripts 270 includes planned illumination 272 of a set of the 3D model's surfaces, and this planned illumination may define illumination levels desired on that surface, color of that illuminated surface, and/or projected still or video content. Each lighting script 270 also includes calibrated lighting and projected content 276 over the timeline of the show/display (lighting timeline) for each of the lighting fixtures in the lighting system, and the lighting/content 276 is chosen to achieve the planned illumination 272.

During operations of a lighting system operated by the controller 200, the controller 200 may transmit one of the scripts 270 to each of the lighting fixtures for use in coordinated operation of these fixtures during the show's timeline. In other implementations, the controller 200 acts to run a lighting script 270 and generate the control signals during the show. Further, once a show has been commenced by the fixtures running one of the lighting scripts 270, the cameras on the fixtures (or a subset of such cameras) are operated to gather camera-collected data 224 which is stored in memory 230 as lighting monitoring data 260. The lighting system control program 250 acts to process this data to determine whether the images from the camera (with image processing techniques) show that the surfaces in the 3D model are being illuminated as planned as defined in the illumination data 272 for the script 270. If not, the control program 250 can act to recalibrate the lighting and projected content 276 in a dynamic manner (e.g., during a show), and this updated script 270 can be transmitted to all the fixtures or to a subset of the fixtures that have their operations affected by the recalibration (e.g., transmit recalibrated lighting and/or projected content 276 to a particular lighting fixture to provide higher (or lower) illumination or to change its projected content and retain the other fixtures in their previously defined operation modes). Note, by having the nodal point information for each projector, a show can be moved to a new location with different projector heights and positions. Then, by rescanning the new location, the virtual model can be moved to the new nodal points and all the projectors and content can be updated to the new positions.

Figure 3:
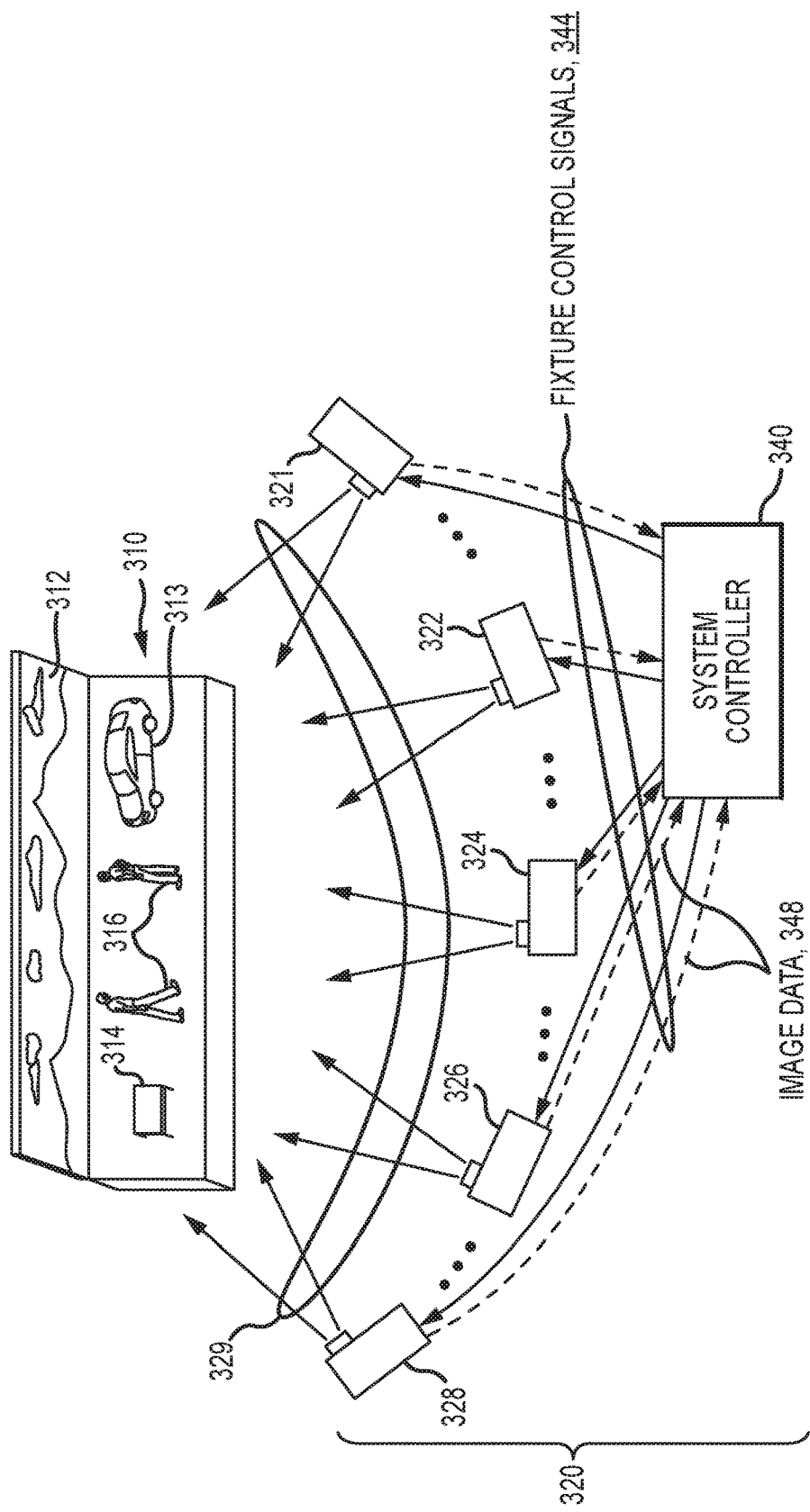
FIG. 3 illustrates a lighting system operating to provide lighting to a stage/space through dynamic control or operation of a plurality of theatrical lighting fixtures of the present description.

FIG. 3 illustrates a lighting system 320 operating to provide lighting of a space (e.g., theatrical stage or the like) 310. The stage 310 includes a backdrop or background scenery 312 that may be 2D or include 3D components, and 3D props 314, 315 are positioned on the stage 310 along with a set of human (or robotic) actors 316. The lighting system 320 includes a plurality of theatrical lighting fixtures 321, 322, 324, 326, and 328, with five fixtures being shown but a system 320 may include two to hundreds or more of the fixtures.

The lighting fixtures 321, 322, 324, 326, 328 are shown to be operating in response to control signals 344 to generate and output light 329 that is directed onto the stage 310 and its 2D and 3D surfaces including background scenery 312, props 314, 315, and actors 316. The fixtures 321-328 may operate concurrently as shown or subsets may be operated in an intermittent manner, with all operations (when on/off, illumination levels, colors, projected content (2D or 3D video), and the like) defined by a show script or via manual operation of the system controller 340 (e.g., via a control GUI presented on an I/O device of the controller 340).

Each of the theatrical lighting fixtures 321-328 may take the form shown in FIG. 1 with fixture 100 while the controller 340 may take the form shown in FIG. 2 with controller 200. As shown, the lighting system 320 includes the system controller 340 that is communicatively linked (e.g., via digital communications that are transmitted in a wired or wireless manner) with each of the lighting fixtures 321-328. In practice, as discussed with reference to FIGS. 1 and 2, the controller 340 functions to receive image data 348 from the fixtures 321-328 in an initial stage, and processes the image data along with known positions of the fixtures 321-328 (and, therefore, of onboard cameras providing the image data 348) to generate a 3D model of the stage 310 that includes the surfaces of the set 312 and 3D props 314, 315 (and actors 316 if positioned on stage 310 to assist in 3D model generation of a show or scene of a show).

From the generated 3D model, a lighting script is generated that defines for each fixture 321-328 when along a show timeline the fixture will operate, at what illumination level, to provide what color light, and to define when it should project image imagery with its output light 329 (e.g., defining video or still image content for projection) with its light modulator (image generator). The lighting script may be stored on each fixture 321-328 for use by its local controller to operate with time synchronization (e.g., each fixture runs script concurrently from synchronized start time) with other fixtures 321-328. In other cases, the system controller 340 will run the show script and provide the control signals 344 to operate each fixture 321-328 to provide the output light 329 to light the stage 310.

Each of the lighting fixtures 321-328 also operates, via its onboard camera(s), to capture image data 348 that is communicated during running/playing a lighting script to the system controller for processing. Specifically, the system controller 340 may determine whether or not the image data indicates that planned illumination is presently occurring on the stage by comparing the image data 348 with a set of planned illumination definitions for the 3D model of the stage (surfaces of the stage and its components) at each moment of (or at predefined points in time along) the show/display timeline associated with the lighting script being used to currently operate the lighting fixtures 321-328. In response, the system controller 340 generates, as needed, additional fixture control signals 344 that are communicated to the appropriate subset of fixtures 321-328 to adjust or modify their operations to affect the output light 329 to better achieve the planned illumination of the surfaces of the stage.

In the same or other implementations, the controller on board each (or a subset) of the fixtures 321-328 functions to process image data captured by their own onboard camera(s) to determine whether planned illumination levels and/or effects are presently being achieved. If not, the controller may modify its own operations to change its output 329 (deviate from the lighting script or modify the illumination or other operational settings defined in the lighting script) and/or may generate a message with this analysis results that it then transmits (in a wired or wireless manner) to all or a particular subset of the other theatrical lighting fixtures 321-328, which act to process the image analysis results to determine if and how to modify their operations from the lighting script.

Figure 4:
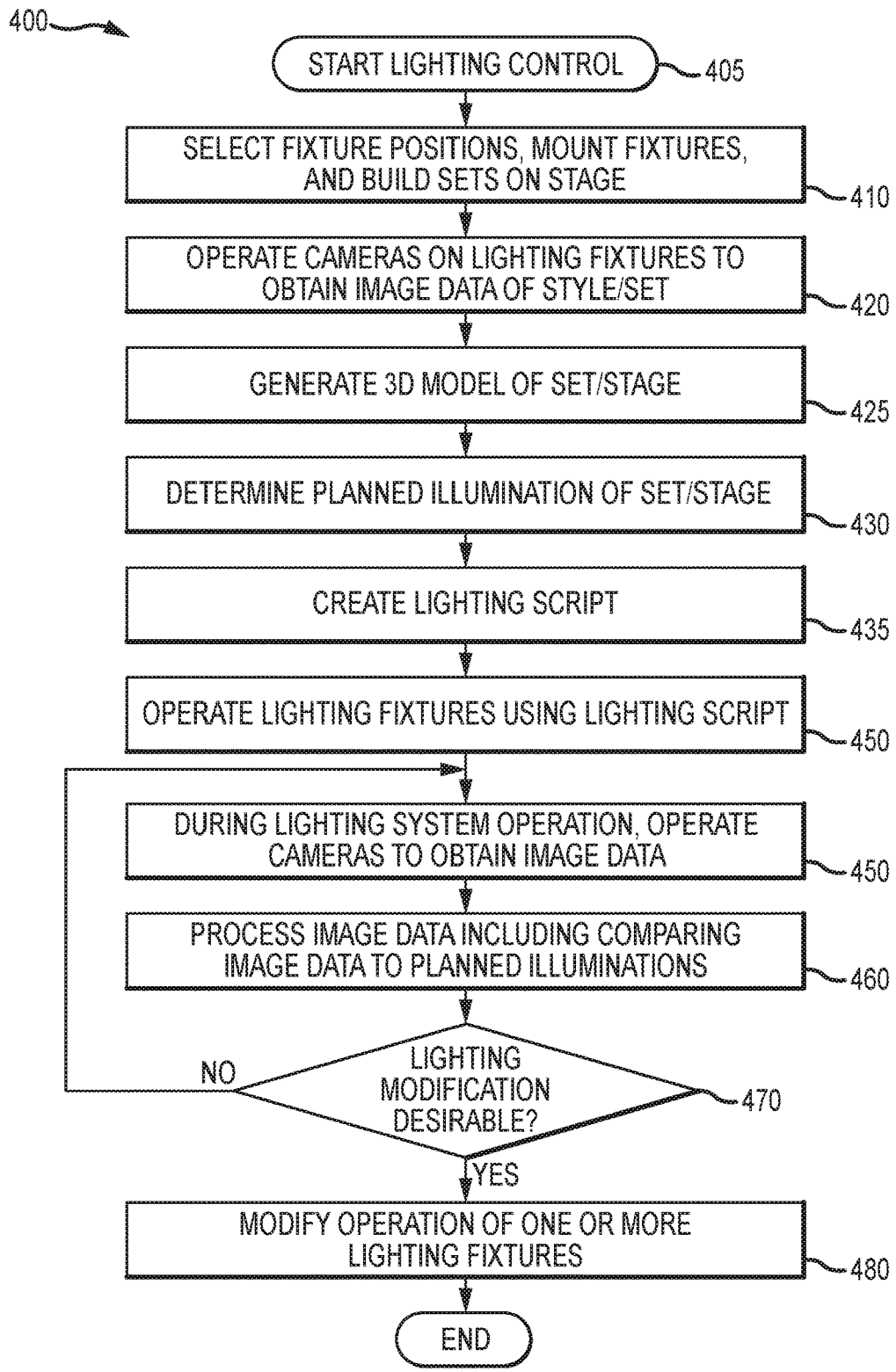
FIG. 4 is a flow diagram for a lighting control method that may be implemented during operation of lighting system of FIG. 3.

FIG. 4 illustrates a lighting control method 400 of the present description such as may be used in a theatrical or other environment to provide lighting with dynamic and ongoing control over the lighting fixtures to achieve desired lighting effects. The method 400 starts at 405 such as with obtaining a number of theatrical lighting fixtures (such as implementations of fixture 100 of FIG. 1) to provide the lighting for a particular theater or other space. Step 405 may also include providing (obtaining) a device to use as the central fixture (or lighting system) controller, and this device may be transformed into a special-purpose device by loading onto it software/code to provide the functionality of generating a 3D model and providing lighting system control. The device, after this configuration or set up, may take the form shown in FIG. 2 with controller 200.

The method 400 continues at 410 with selecting positions in the space/theater for each of the theatrical lighting fixtures and mounting these fixtures to be directed toward a particular portion of the space (e.g., toward a portion of a stage in the theater/space, toward a set for a display along an amusement park ride, and the like). The specific position (and, in some cases, orientation) of each of the fixtures is determined and logged for later use in processing camera-collected image data and for creating a lighting script. Step 410 may also include building the set or scene on the stage or within the space/theater, and this may include creating scenery (2D and 3D scenery components), positioning 3D props and objects in the space (e.g., on the stage), and, in some cases, positioning actors or stand-in props on the stage to simulate surfaces in the space during a particular show/display (or point within the show/display).

The method 400 continues at 420 with operating the cameras of the lighting fixtures to obtain a set of image data or images of the space including the stage with its scenery and props from the POV of each lighting fixture. At 425, the method 400 includes generating a 3D model (such as 3D model generator software running on the system controller or other computing device) of the space/stage by processing the image data along with the known nodal positions of each of the cameras. This 3D model will include each of surfaces in the space targeted by the lighting fixtures (e.g., surfaces of 3D objects as well as 2D surfaces).

With this 3D model as input, a display or show designer may complete step 430 by defining planned illumination of the set/stage. The illumination will be defined for each point in time along the display/show timeline for each of the 3D surfaces in the model. This illumination may include illumination levels, colors desired for each surface, and content/media to be displayed on each surface in the 3D model. Then at 435, the method 400 continues with creating a lighting script that defines operation of each of the lighting fixtures over the show/display timeline to achieve the planned illumination of the set/stage from step 430. The lighting script generation 435 may include mapping content to the 3D model's surfaces such as using projection mapping (or video mapping) techniques.

At 440, the method 400 continues with operating the lighting fixtures in the lighting system using the lighting script of step 435 to provide lighting to the space. Particularly, each fixture operates its light source and light modulator to output light as defined in the lighting script. At step 450, the cameras of all or a subset of the lighting fixtures are operated to capture image data while concurrently providing lighting to space. In this way, the image data captures the presently achieved illumination of the surfaces on the stage/set that were previously defined in the 3D model. Then, at step 460, the captured image data is processed (by hardware and/or software on each fixture and/or on the central fixture controller), and this processing or analysis includes comparing the image data (e.g., measured illumination levels and/or colors on each surface) to the planned illumination from step 430.

At step 470, a determination is made (e.g., by control program on the central controller or fixture control program on one or more of the lighting fixtures) as to whether lighting modification is needed or at least desirable to achieve a better match between the planned illumination of the surfaces in the space and those measured via the captured image data. If not, the method 400 continues with repeating step 450 (such after a preset delay (e.g., capture image data once every 30 to 90 seconds or a longer or shorter period may be used) or on an ongoing basis). Note, the method 400 may end at 490 when the lighting script being followed in step 440 ends (or the time period for the show/display ends).

If at 470 modification of illumination is determined to be desirable (e.g., such as when illumination levels vary by some preset amount or fraction, when a surface is not a correct color, and so on), the method 400 continues at 480 with modifying (by the fixture controller or the central controller and their software/hardware) operation of one or more of the theatrical lighting fixtures in the lighting system to adjust the lighting provided to the space (or stage's surfaces). Again, the modification may vary to practice the method 400, but, for example, it may involve increasing or decreasing the illumination intensity/level provided by a light source, changing the color of the output light, and/or changing the video content being projected via combined operations of a light source and light modulator in a lighting fixture. The method 400 can continue with repeating step 450 to determine if the modified operations of the lighting fixtures has provided a match (or a better match) with the planned illumination. In other cases, the method 400 may end at 490.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

I claim:

1. A theatrical lighting fixture for use in a lighting system to provide lighting to a space such as a theatrical stage or set, comprising:
    a housing;
    a light source in the housing operable to generate light;
    a light modulator, in the housing, operable to modulate the light generated by the light source to form one or more images;
    a camera, supported by the housing, operable to capture digital images;
    a communications module in the housing; and
    a fixture controller operable to generate control signals to selectively operate the light source, the light modulator, and the camera and to transmit and receive communications with the communications module,
    wherein the fixture controller modifies operation of the light source or the light modulator with the control signals in response to image processing of the images captured by the camera,
    wherein the image processing includes comparing the images with planned illumination of surfaces of a 3D model of a space,
    wherein the comparing includes determining illumination of one of the surfaces differs from the planned illumination for the one of the surfaces, and
    wherein the modifying of the operation of the light source or the light modulator includes modifying the light generated by the light source.

2. The theatrical lighting fixture of claim 1, wherein the light source comprises a light emitting diode (LED) light source or a laser light source and wherein the light modulator comprises a digital light processing (DLP) modulator.

3. The theatrical lighting fixture of claim 1, wherein the camera includes a lens and wherein the camera is positioned in the housing such that the lens is substantially coaxial with an output axis of the light modulator.

4. The theatrical lighting fixture of claim 1, wherein the transmitted communications include the captured images from the camera and wherein the communications are transmitted to a central lighting system controller or to another theatrical lighting fixture in a lighting system.

5. The theatrical lighting fixture of claim 1, further including memory in the housing storing a lighting script, wherein the lighting script includes projector content and wherein the controller controls the light source to generate the light based on the lighting script including setting illumination levels and controls the light modulator to form the one or more images using the projector content.

6. A system for lighting a space such as a theatrical stage, comprising:
    a lighting system controller generating a set of control signals; and
    a plurality of lighting fixtures operating in response to receipt of one or more the control signals to output light into the space,
    wherein each of the lighting fixtures includes a light source, a light modulator modulating light from the light source and outputting the modulated light, and a camera capturing images of the space during operations of the light source and the light modulator,
    wherein the set of control signals are generated based on processing of the captured images,
    wherein the processing of the captured images includes comparing illumination of surfaces in the space shown in the captured images with planned illumination of the surfaces in the space, and
    wherein the set of control signals are generated to implement a lighting script defined for the space to vary the output light over a timeline for a show or display.

7. The system of claim 6, wherein the lighting script is generated to provide planned illumination over the timeline for a plurality of surfaces in the space and wherein the plurality of surfaces correspond with surfaces in a 3D model of the space generated using images captured by the cameras.

8. The system of claim 6, wherein the lighting fixtures each further includes a communications module operable to provide inter-fixture messaging between the lighting fixtures and wherein the lighting fixtures each further includes a controller processing the inter-fixture messaging and, in response, modifying operation of at least one of the light sources and the light modulators to modify the output light.

9. The system of claim 6, wherein the light modulator modulates the light from the light source to generate an image projected from the light fixture onto surfaces in the space.

10. A system for lighting a space such as a theatrical stage, comprising:
    a lighting system controller generating a set of control signals; and a plurality of lighting fixtures operating in response to receipt of one or more the control signals to output light into the space, wherein each of the lighting fixtures includes a light source, a light modulator modulating light from the light source and outputting the modulated light, and a camera capturing images of the space during operations of the light source and the light modulator, wherein the lighting fixtures each further includes a communications module operable to provide inter-fixture messaging between the lighting fixtures, and wherein the lighting fixtures each further includes a controller processing the inter-fixture messaging and, in response, modifying operation of at least one of the light sources and the light modulators to modify the output light.

11. The system of claim 10, wherein the set of control signals are generated based on processing of the captured images and wherein the processing of the captured images includes comparing illumination of surfaces in the space shown in the captured images with planned illumination of the surfaces in the space.

12. The system of claim 10, wherein the set of control signals are generated to implement a lighting script defined for the space to vary the output light over a timeline for a show or display and wherein the lighting script is generated to provide planned illumination over the timeline for a plurality of surfaces in the space and wherein the plurality of surfaces correspond with surfaces in a 3D model of the space generated using images captured by the cameras.

13. The system of claim 10, wherein the light modulator modulates the light from the light source to generate an image projected from the light fixture onto surfaces in the space.

* * * * *